(12) United States Patent
Kevern

(10) Patent No.: US 6,422,759 B1
(45) Date of Patent: *Jul. 23, 2002

(54) FIBER OPTIC CONNECTOR

(75) Inventor: James David Kevern, Wellsville, PA (US)

(73) Assignee: Tyco Electronics Corporation, Middletown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,369

(22) Filed: Jun. 30, 1998

Related U.S. Application Data

(60) Provisional application No. 60/087,330, filed on May 29, 1998.

(51) Int. Cl.[7] ................................................. G02B 6/38
(52) U.S. Cl. ........................... 385/60; 385/58; 385/59; 385/62; 385/66; 385/72; 385/78
(58) Field of Search ......................... 385/58, 59, 60, 385/62, 66, 72, 78

(56) References Cited

U.S. PATENT DOCUMENTS

| | | | |
|---|---|---|---|
| 4,453,142 A | 6/1984 | Murphy | 333/26 |
| 4,515,434 A | 5/1985 | Margolin et al. | 350/96.21 |
| 4,605,281 A | 8/1986 | Hellewell | 350/96.21 |
| 4,645,295 A | * 2/1987 | Pronovost | 385/55 |
| 4,695,126 A | 9/1987 | Cook | 350/96.21 |
| 4,726,647 A | * 2/1988 | Kakii | 385/60 |
| 4,934,785 A | 6/1990 | Mathis et al. | 350/96.21 |
| 5,073,042 A | 12/1991 | Mulholland et al. | 385/69 |
| 5,085,594 A | 2/1992 | Kaelin | 439/427 |
| 5,318,458 A | 6/1994 | Thörner | 439/427 |
| 5,396,572 A | 3/1995 | Bradley et al. | 385/78 |
| 5,481,634 A | 1/1996 | Anderson et al. | 385/76 |
| 5,563,974 A | 10/1996 | Carpenter et al. | 385/85 |
| 6,079,880 A | * 6/2000 | Blom | 385/60 |

FOREIGN PATENT DOCUMENTS

| | | | |
|---|---|---|---|
| DE | 4203966 A1 | 2/1991 | G02B/6/36 |
| EP | 0547777 A1 | 11/1992 | G02B/6/38 |

* cited by examiner

*Primary Examiner*—Thong Nguyen
*Assistant Examiner*—Leo Boutsikaris

(57) ABSTRACT

The present invention is directed to a connector assembly comprised of an adapter 14 that is engageable with one or more connectors 12. The adapter 14 has a plurality of alignment tabs 28 formed therein. When the adapter 14 and the connector 12 are in mated engagement, the alignment tabs 28 are positioned within a plurality of recesses 44 formed in the connector 12.

17 Claims, 4 Drawing Sheets

FIBER OPTIC CONNECTOR

CROSS REFERENCE TO RELATED APPLICATIONS

This application is based on and claims priority of co-pending U.S. Provisional Application No. 60/087,330, filed May 29, 1998.

FIELD OF THE INVENTION

The present invention is generally related to electrical connectors and, more particularly, a connector used for connecting optical fibers.

BACKGROUND OF THE INVENTION

Optical fibers are used in many telecommunication applications. For example, optical fibers are used in data transmission applications because of their wide bandwidth and large capacity for carrying information in the form of light waves that are basically unaffected by electromagnetic fields. Some connectors are designed such that optical fibers are positioned within a ferrule that is, in turn, positioned within a connector housing. These ferrules may take any shape or configuration but they typically have a rectangular or circular cross-section.

However, one problem encountered in using optical fiber transmission systems is that it is difficult to properly align two optical fibers within a connector. If the abutting ends of two optical fibers are not properly aligned, many problems may occur, such as signal loss or attenuation. The difficulty of properly aligning mating optical fibers is due, in part, to their very small diameter.

Some optical fiber connectors have coarse and/or fine means for properly aligning the optical fibers to be mated together. For applications requiring very precise positioning of the mating optical fibers, a connector may employ both a coarse positioning means and a fine positioning means. Typically, the coarse positioning means is engaged before the fine positioning means and serves to pre-align the fine positioning means. For example, an illustrative fine positioning means in a fiber optic connector includes a slotted cylindrical sleeve positioned in an adapter having an inner diameter slightly smaller than an outer diameter of a fiber optic ferrule. Two mating ferrules enter the cylindrical sleeve from opposite ends to center endfaces of the ferrule relative to each other. An illustrative coarse positioning means includes a portion of the mating connector housing which engages the adapter prior thereby aligning the ferrule held within the housing with the cylindrical sleeve prior to entry of the ferrule into the sleeve. However, some connectors are designed to connect optical fibers without the use of both fine and coarse positioning means, i.e., some connectors may only require the use of a coarse positioning means to align the optical fibers such that the mated connection will perform satisfactorily for the intended application.

The proper alignment of most optical fibers typically requires very precise positioning. For example, connectors using guide pins to assist in the alignment of the optical fibers, which are typically fiber array connectors, require that the guide pins and mating guide holes have very tight tolerances. The guide pins and holes typically engage one another before the optical fibers come into contact with each other, thereby properly relatively aligning the connnector ferrules which hold the optical fibers before they actually engage or abut one another. However, some connectors used to mate optical fibers do not employ such guide pins and holes. Nevertheless, even in these type of connectors, it is important that the optical fibers be properly aligned.

Irrespective of the precise configuration of the connector, i.e., the connector may or may not employ a ferrule, or positioning pins, properly positioning abutting optical fibers may require that some of the mating parts within a connector have very tight tolerances. For example, for connectors in which an optical fiber is positioned within a ferrule, the ferrule may be sized such that it fits within a very precise opening in a portion of a mating housing.

Due to the small geometry of the fibers to be aligned and of the fiber optic connector, the elements that perform the fiber to fiber alignment in the connector are quite small. In order to provide smooth connector mating, it is important that the fiber alignment elements initiate and engage in a smooth and continuous operation. Given the small size of the fiber alignment elements, for example, guide pins and holes, it is desirable to provide a connector that pre-aligns the fiber alignment elements to ensure their proper engagement as mating connectors meet and are joined together. Another important requirement of any fiber optic connector is that the connector must provide sufficient mechanical stability and protection for the optical fiber before, during and after the mating of the connector halves. As discussed above, the optical fibers are very small and thus very susceptible to mechanical damage during the installation process if not properly protected.

The present invention is directed to a connector that solves or reduces some or all of the aforementioned problems.

SUMMARY OF THE INVENTION

The present invention is directed to a connector assembly comprised of a first member having a plurality of recesses and a second member adapted for mating engagement with the first member. A plurality of alignment tabs is disposed on the second member. The alignment tabs are adapted to be positioned within the recesses in the first member.

In one embodiment, the invention may further comprise an adapter having a plurality of cavities therein. The cavities are adapted to receive a connector therein. A plurality of alignment tabs is disposed on the adapter. The alignment tabs are to be positioned within a plurality of recesses on the connector when the connector and adapter are in complete mated position.

In another embodiment, the present invention may further comprise a connector having a plurality of recesses formed therein. The connector is mateable with an adapter. The plurality of recesses in the connector are adapted to receive a plurality of alignment tabs formed on said adapter when the adapter and the connector are in mating engagement.

BRIEF DESCRIPTION OF THE DRAWINGS

The invention may be understood by reference to the following description taken in conjunction with the accompanying drawings, in which like reference numerals identify like elements, and in which.

Figure 1:
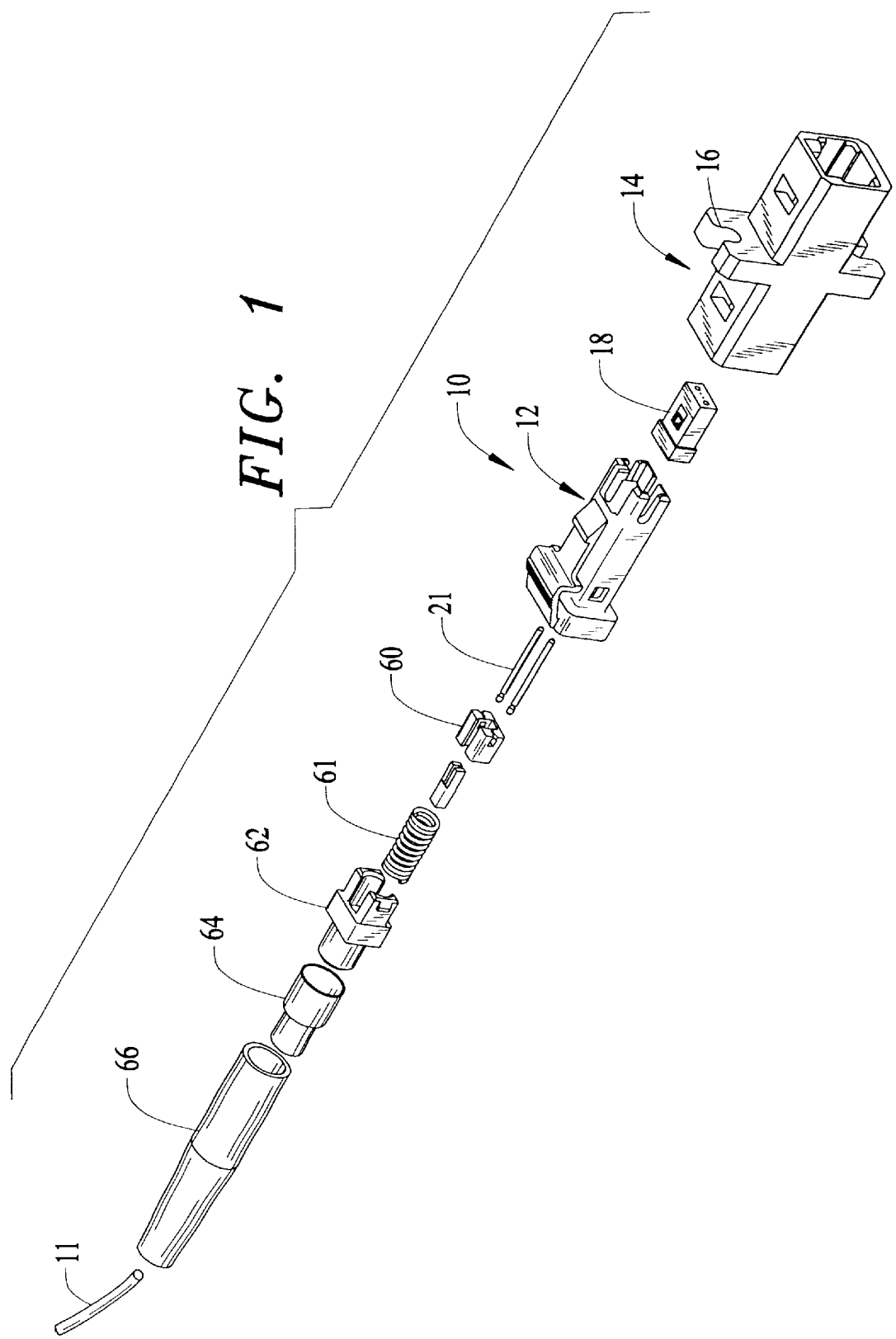
FIG. 1 is an exploded, perspective view of a connector assembly according to the teachings of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached drawings. One illustrative embodiment of the present invention is shown in FIG. 1. A connector assembly 10 may be comprised of a connector 12 and an adapter 14. An optical fiber cable 11 may be coupled to a connector 12. As will be apparent to those skilled in the art, the adapter 14 shown in FIG. 1 is designed to be engaged with two of the connectors 12 shown in FIG. 1. Of course, the adapter 14 may be designed to be engaged with only one of such connectors. Each of the connectors 12 will have an optical fiber positioned within them that may be aligned with a corresponding optical fiber in another connector. However, for purposes of clarity, only one connector 12 is shown in the drawings. The adapter 14 may be coupled to any device, e.g., a bulkhead or a computer, by the mounting slots 16 in the adapter 14. In addition the geometry of at least one half of the adapter may be employed as part of a transceiver.

The optical fiber cable 11 may be terminated with a connector 12 by any of a variety of techniques and devices. In one illustrative embodiment, as shown in FIGS. 1, 2A, 2B and 2C, an optical fiber cable 11 is connected to the connector 12 such that at least one optical fiber 15 is positioned within a ferrule 18, and the ferrule 18 is positioned within the housing 20 of the connector 12. For example, this may be accomplished through use of a guide pin clip 60, a fiber stress relief boot 63, a spring 61, a spring push member 62, an outer crimp member 64 and a cable stress relief boot 66 employing assembly techniques known in the art. One illustrative embodiment of a technique for assembling a fiber optic cable within a cylindrical connector is shown in U.S. Pat. No. 5,073,042, which is hereby incorporated by reference in its entirety. Irrespective of the techniques or devices used, the objective is to position at least one optical fiber 15 within the connector 12 such that the optical fiber 15 is ready to be engaged with a corresponding optical fiber (not shown) positioned in a separate connector.

Figure 3:
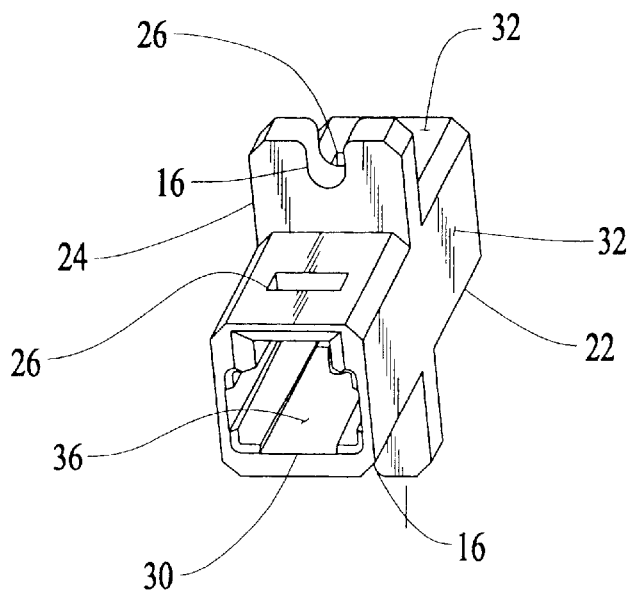
FIG. 3 is a perspective view of one illustrative embodiment of an adapter for use in the present invention.
Figure 4:
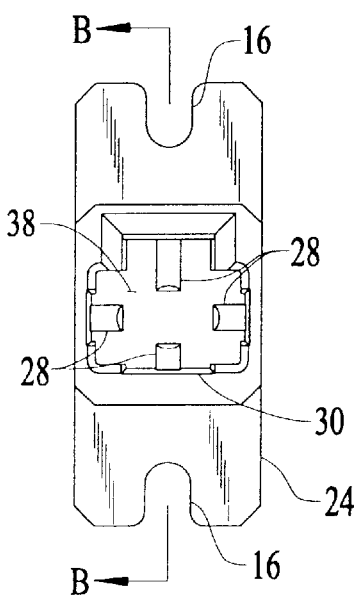
FIG. 4 is an end view of the adapter shown in FIG. 3.
Figure 5:
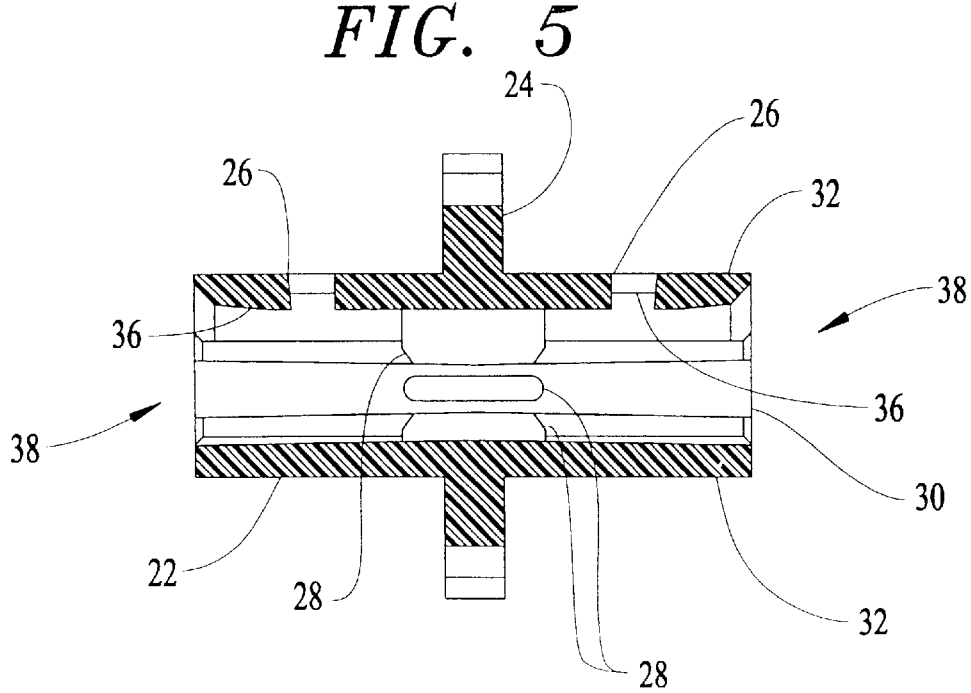
FIG. 5 is a cross-sectional view of the device shown in FIG. 3.
Figure 6:
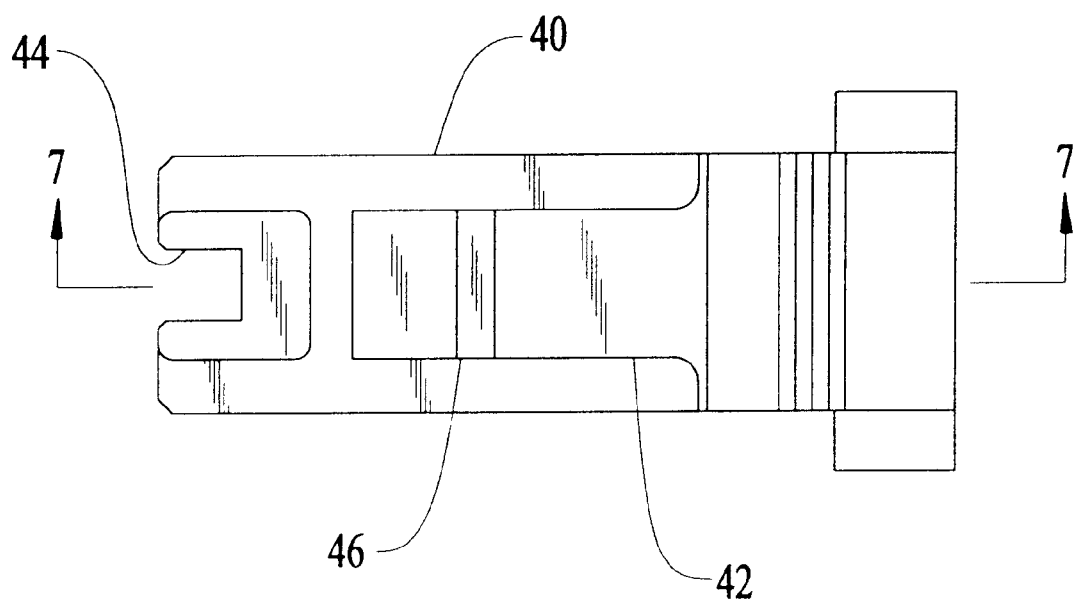
FIG. 6 is a plan view of one illustrative embodiment of a connector for use in the present invention.
Figure 7:
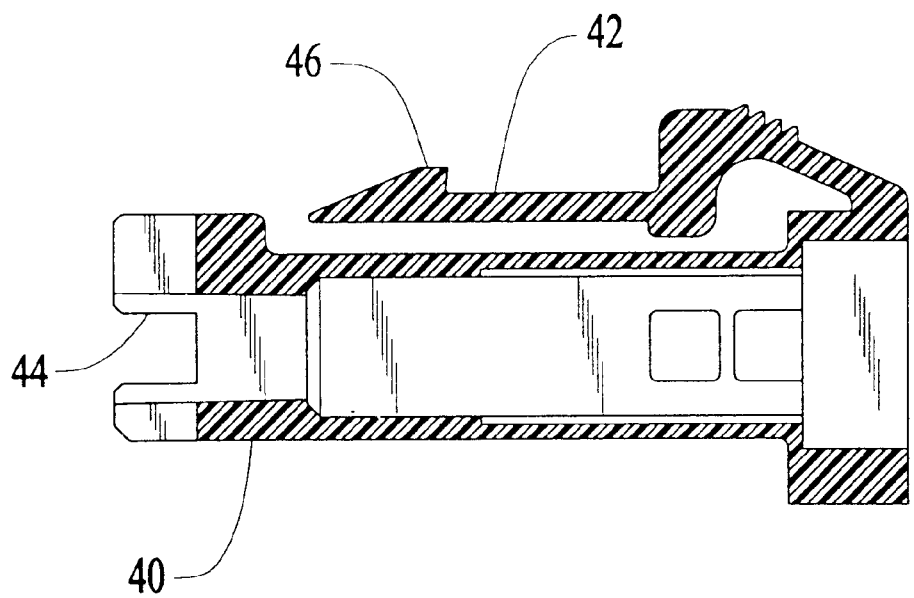
FIG. 7 is a cross-sectional view of the device shown in FIG. 6.

The adapter 14 may be made in many configurations and sizes. One illustrative embodiment of the adapter 14 is shown in FIGS. 3–5. The illustrative adapter 14 may be comprised of a body 22, a flange 24 and a plurality of latch recesses 26 in the body 22. A plurality of mounting slots 16 is disposed in the flange 24. The mounting slots 16 may be used to mount the adapter 14 on any of a variety of devices that may use the present invention. For example, the adapter 14 may be mounted to the housing of the tower case of a computer or may be part of a transceiver unit. It should be recognized that other methods of mounting such as screw holes, metal tabs, rivets, etc. are also possible. The adapter 14 is further comprised of a plurality of alignment tabs 28 formed within the body 22 of the adapter 14. The adapter 14 has a generally rectangular opening 30 and a plurality of sidewalls 32. The inner surfaces 36 of the sidewalls 32 define a cavity 38 that is generally rectangular in cross-section. The alignment tabs 28 project inward into the cavity 38 formed in the body 22 of the adapter 14.

The adapter 14 shown in FIGS. 3 through 5 is designed to be engaged with two of the connectors 12. The connector 12 may be of any size, shape or configuration. One illustrative embodiment of the connector 12 is shown in FIGS. 1, 2A, 6 and 7. The illustrative connector 12 may be comprised of a housing 20, a lever 42, and a plurality of recesses 44. The lever 42 has an engagement portion 46. When the connector 12 is mated to the adapter 14, the engagement portion 46 of the lever 42 is positioned in the latch recess 26 of the adapter 14. The alignment tabs 28 of the adapter 14 are designed to be positioned within the recesses 44 in the housing 20 of the connector 12 when the connector 12 is in mated engagement with the adapter 14. In one illustrative embodiment, there are four alignment tabs 28 positioned on the adapter 14. Of course, as will be readily appreciated by those skilled in the art, the number, size, and location of the alignment tabs 28 is a matter of design choice.

The alignment tabs 28 of the adapter 14 act as a pre-alignment feature for ensuring proper mating alignment of alignment pins 21 and corresponding guide pin holes (not shown) to be joined together. When the adapter 14 and the connector 12 are in complete mated position, the ferrule 18 is positioned between the alignment tabs 28 in the adapter 14. The adapter 14, connector 12 and ferrule 18 are designed such that, as the connector 12 is being inserted into the adapter 14, portions of the outer surface 50 (see FIGS. 2A–2C) of the ferrule 18 engage the alignment tabs 28. As shown in FIG. 2B, the engagement between the outer surface 50 of the ferrule 18 and the alignment tabs 28 occurs before the engagement of the alignment pins 21 (if any are used) with the alignment holes 27 in a ferrule 18 positioned in a mating connector 29.

Figure 2A:
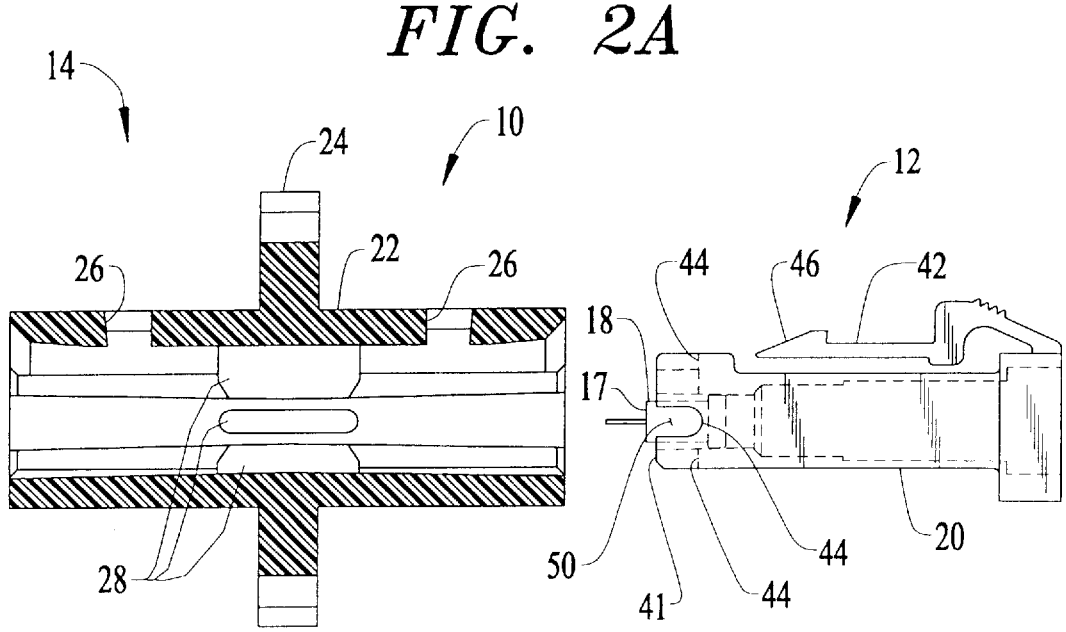
FIG. 2A is a side view of a connector prior to engagement with an adapter.
Figure 2B:
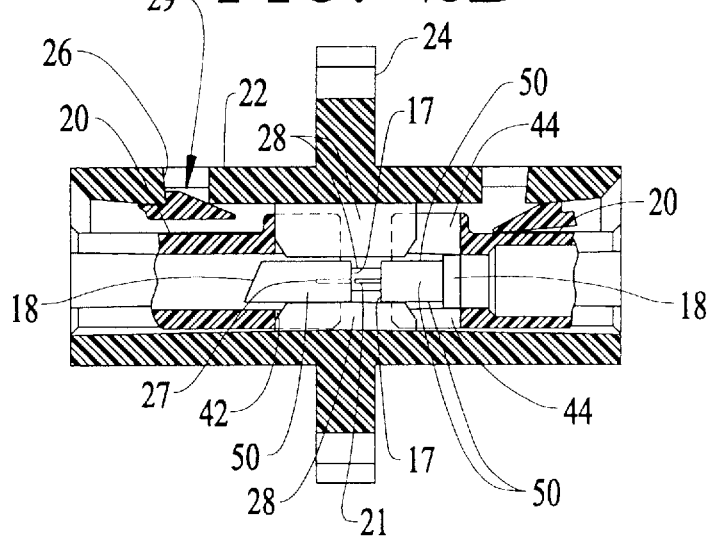
FIG. 2B is a cross-sectional, side view of an illustrative connector as it is being inserted into an illustrative adapter of the present invention.
Figure 2C:
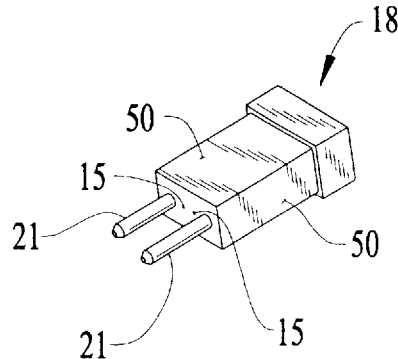
FIG. 2C is a perspective view of an illustrative ferrule that may be used with the present invention.

As shown in FIG. 2A, as connector 12 is further inserted into the adapter 14, the alignment pin 21 engages alignment holes 27 in the ferrule 18 positioned in connector 29. At this time, the alignment pin 21 and the alignment holes 27 perform the function of precisely aligning the optical fibers 15 in each connector 12, 29. The connector 12 is inserted into the adapter 14 until such time as the front surface 17 of each ferrule 18 abut one another, and the engagement portion of the connector 12 engages the recess 26 in the adapter 14. Thus, the alignment tabs 28 act to position the ferrule 18 within the adapter 14 and, at the same time, pre-align the alignment pins 21 for forthcoming engagement with the alignment holes 27 in a mating connector 29. Thus, the engagement of the alignment tabs 28 with the recesses 44 pre-align the alignment pins 21 and alignment holes. The complete mating engagement of the alignment pins 21 and the alignment holes operate to complete alignment of the mating optical fibers 15 in the final assembled connector.

The spacing between the alignment tabs 28 and the ferrule 18 is controlled to ensure at least partial and self-correcting engagement between the alignment pins 21 and the corresponding alignment holes. In general, this spacing should be as small as possible, but not so small as to interfere with the proper functioning of the alignment pins. The spacing between the alignment tabs 28 and the outer surface 50 of the ferrule 18, therefore, ranges from pin/hole location tolerance to plus or minus a radius of the alignment pins 21 positioned in the ferrule 18.

It is preferred that there be at least one recess and alignment tab feature on each side of the housing which aids in maintaining a clearance between the ferrule and the housing when the housing is subject to application of a side load to prevent unacceptable insertion loss. As a side load is applied, the intersection of the connector housing with the end of the adapter acts as a fulcrum and the housing rotates about it in response to the side load. As the housing rotates, the end of the housing moves toward the inside wall of the adapter. The engagement of the guide pins and guide pin holes maintains proper fiber alignment as the housing moves. Due to the recesses, opposite sides of the housing act as independent cantilever beams and flex toward the ferrule as the housing further rotates in response to the side load. As the ferrule and housing press together, there is a force applied which has a force component transverse to the mating alignment axis yielding unacceptable fiber misalignment. The presence of the recesses and alignment tabs on the sides of the housing advantageously provides a physical stop and, therefore, resistance to movement of the housing relative to the adapter.

The present invention should not be considered limited to the particular size or shape of the illustrative connector 12 shown in FIG. 1. In fact, the present invention may be employed in round or rectangular connectors and may be employed to connect optical fibers with or without the use of alignment pins 21 or ferrules 18. That is, the alignment tabs 28 may be configured so as to engage the optical fibers 15 directly or any of the structure surrounding a typical optical cable.

Additionally, the alignment tabs 28 could be formed on the connector 12, and the recesses 44 into which the alignment tabs 28 would be positioned could be formed on the adapter 14. Of course, this would require modifications to the present design, but the recesses 44 and alignment tabs 28 may be configured and located other than as shown in the attached drawings and still obtain the benefit of the present invention.

The present invention provides an improved electrical connector for coupling optical fibers. Using the present invention, the front surface 17 of the ferrule 18 extends a shorter distance beyond the forward end 41 of the housing 20 of the connector 12 as compared to prior art connectors. Those skilled in the art will recognize this as a valuable feature because the ferrule 18 may be made of a breakable material (for example, a ceramic material) and minimizing the extension of the ferrule beyond the connector minimizes the bending moment on the ferrule which reduces the range of potential angular misalignment of the endface of the ferrule relative to the housing. In addition, the less the ferrule 18 extends beyond the forward end 41 of the housing 20 of the connector 12, the less the chance for damage to the ferrule 18 and/or optical fiber 15 when the connector 12 is in an unmated condition. The actual distance the front surface 17 of the ferrule 18 extends beyond the forward end 41 of the connector housing 20 is a matter of design choice. In practice, this extension may range from 0.2 mm to 1.5 mm. In one illustrative embodiment, the front surface 17 of the ferrule 18 extends only approximately 0.8 mm beyond the forward end of 41 the housing 20 of the connector 12.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A connector assembly comprising:

a connector having a first alignment structure and a second alignment structure, said first alignment structure comprising a plurality of recesses;

a mating member adapted for mating engagement with said connector, said mating member having a plurality of internal surfaces defining a cavity therein and comprising a first cooperating alignment structure and a second cooperating alignment structure, said first cooperating alignment structure comprising a plurality of alignment tabs on said mating member, at least a portion of at least some of said plurality of alignment tabs extending into said cavity in said mating member, said alignment tabs adapted for being positionable with said recesses in said connector when said connector and mating member are in mating engagement;

wherein said connector and said mating member cooperate in a first position in which said first alignment structure interfaces with said first cooperating alignment structure to effect a first alignment of said connector with said mating member, said first alignment being sufficient to position said second alignment structure within a certain distance to said second cooperating alignment structure such that said second alignment structure is able to interface with said second cooperating alignment structure; and wherein said connector and said mating member cooperate in a second position in which said second alignment structure interfaces with said second cooperating alignment structure to effect a second alignment of said connector with said mating member, said second alignment having a closer tolerance than said first alignment.

2. The connector assembly of claim 1, wherein said first cooperating alignment structure comprises at least two alignment tabs.

3. The connector assembly of claim 2, wherein said first cooperating alignment structure comprises at least four alignment tab, and said first alignment structure comprises at least four recesses, a tab and a recess being positioned on a different portion of a cross section of said connector assembly transverse to a mating axis corresponding to said mating engagement.

4. The connector assembly of claim 1, wherein said connector comprises a generally rectangular housing.

5. The connector assembly of claim 1, wherein said mating member has a generally rectangular housing.

6. The connector assembly of claim 1, wherein said connector further comprises a ferrule containing at least one optical fiber, said ferrule being positionable between said plurality of alignment tabs when said connector and mating member are in mating engagement.

7. The connector assembly of claim 6, wherein said second alignment structure is disposed on said ferrule and comprises one of pins or pin-receiving holes, and the second cooperating alignment structure is the other of said pins or said pin-receiving holes.

8. The connector assembly of claim 6, wherein said recesses are disposed on said ferrule.

9. A connector assembly comprising:

a connector having a first alignment structure and a second alignment structure, said first alignment structure comprising a plurality of recesses;

a mating member adapted for mating engagement with said connector and comprising and adapter and a mating connector held in a fixed position relative to said adapter;

a plurality of alignment tabs in said adapter, said alignment tabs being positionable in said recesses when said connector is in mated engagement with said mating member;

wherein said connector and said mating member cooperate in a first position in which said recesses interface with said mating member, said first alignment being sufficient to position said second cooperating alignment structure of said mating member such that said second alignment structure is able to interface with said second cooperating alignment structure; and wherein said connector and said mating cooperate in a second position in which said second alignment structure interfaces with said second cooperating alignment structure to effect a second alignment of said connector with said mating member, said second alignment having closer tolerance than said first alignment.

10. The connector assembly of claim 9, wherein said adapter comprises at least two alignment tabs.

11. The connector assembly of claim 10, wherein said adapter comprises at least four alignment tabs, and said first alignment structure comprises at least four recesses, a tab and a recess being positioned on a different portion of a cross section of said connector assembly transverse to a mating axis corresponding to said mating engagement.

12. The connector assembly of claim 9, wherein said connector further comprises a ferrule containing at least one optical fiber, said ferrule being positionable between said plurality of alignment tabs when said connector and mating member are in mating engagement.

13. The connector assembly of claim 12, wherein said second alignment structure is disposed on said ferrule and comprise one of pins or pin-receiving holes, and the second cooperating alignment structure is the other of said pins or said pin-receiving holes.

14. The connector assembly of claim 12, wherein said recesses are disposed on said ferrule.

15. A connector assembly comprising:

a connector having a forward end and ferrule having an optical fiber positioned therein, said ferrule having a front surface that extends no more than approximately 1.5 mm beyond said forward end of said connector, said ferrule comprising at least a first alignment structure, which comprises a plurality of recesses, and a second alignment structure;

a mating member adapted for mating engagement with said connector comprising an adapter and a mating connector held in a fixed position relative to said adapter;

a plurality of alignment tabs in said adapter, said alignment tabs being positionable in said recesses when said one connector is in mated engagement with said mating member;

wherein said connector and said mating member cooperate in a first position in which said recesses interface with said plurality of alignment tabs to effect a first alignment of said connector with said mating member, said first alignment being sufficient to position said second alignment structure of said connector within a certain distance to a second cooperating alignment structure of said mating member such that said second alignment structure is able to interface with said second cooperating alignment structure; and wherein said connector and said mating member cooperate in a second position in which said second alignment structure interfaces with said second cooperating alignment structure to effect a second alignment of said connector with said mating member, said second alignment having a closer tolerance than said first alignment.

16. The connector assembly of claim 15, wherein said from surface of said ferrule extends approximately 0.6–1.0 mm beyond the forward end of said connector.

17. The connector assembly of claim 15, wherein said front surface of said ferrule extends approximately 0.5 mm beyond the forward end of said connector.

* * * * *